United States Patent [19]

Oxenreider et al.

[11] 4,377,197

[45] * Mar. 22, 1983

[54] APPARATUS AND METHOD FOR CASTING LEAD INTO PLASTIC FOR SIDE TERMINAL BATTERIES

[75] Inventors: Terry Oxenreider, Wernersville; Donald A. Duesterhoeft, Robesonia; Edgar M. Erb, Lancaster, all of Pa.

[73] Assignee: General Battery Corporation, Reading, Pa.

[*] Notice: The portion of the term of this patent subsequent to Jun. 19, 1996, has been disclaimed.

[21] Appl. No.: 233,483

[22] Filed: Feb. 11, 1981

Related U.S. Application Data

[62] Division of Ser. No. 27,656, Apr. 6, 1979, Pat. No. 4,284,122, which is a division of Ser. No. 753,835, Dec. 23, 1976, Pat. No. 4,158,382.

[51] Int. Cl.³ ............ B22D 17/04; B22D 19/00
[52] U.S. Cl. .................. 164/112; 164/113; 164/305; 164/318; 164/332; 164/DIG. 1
[58] Field of Search ............ 164/332, 334, 112, 113, 164/305, 318, DIG. 1; 249/91, 93; 425/125

[56] References Cited

U.S. PATENT DOCUMENTS

| | | | |
|---|---|---|---|
| 1,678,812 | 7/1928 | Hornig | 249/91 X |
| 2,003,053 | 5/1935 | Pavlovic et al. | 173/259 |
| 2,059,506 | 11/1936 | Ambruster | 136/168 |
| 2,066,597 | 1/1937 | West | 136/135 |
| 2,393,588 | 1/1946 | Cherry et al. | 164/316 |
| 2,735,148 | 2/1956 | Shannon et al. | 164/105 X |
| 2,976,571 | 3/1961 | Moslo | 249/141 |
| 3,273,211 | 9/1966 | Miraldi | 164/24 |
| 3,457,118 | 7/1969 | Miller | 136/135 |
| 3,515,204 | 6/1970 | McAlpine et al. | 164/334 |
| 3,537,139 | 11/1970 | Segmüller | 425/549 |
| 3,542,328 | 11/1970 | Deitrick | 249/95 |
| 3,542,330 | 11/1970 | Wirtz | 164/410 X |
| 3,579,386 | 5/1971 | Tiegel et al. | 136/134 |
| 3,607,441 | 9/1971 | Mix | 136/176 |
| 3,674,085 | 7/1972 | Clingenpeel et al. | 164/DIG. 1 |
| 3,711,335 | 1/1973 | Daniel | 136/135 S |
| 3,718,174 | 2/1973 | Hull et al. | 164/154 |
| 3,798,071 | 3/1974 | Sabatino | 136/134 |
| 3,849,203 | 11/1974 | Hollis et al. | 136/134 R |
| 3,874,933 | 4/1975 | Mocas | 164/113 X |
| 4,034,793 | 7/1977 | Okura et al. | 164/410 X |
| 4,158,382 | 6/1979 | Oxenreider et al. | 164/305 |
| 4,284,122 | 8/1981 | Oxenreider et al. | 164/332 X |

Primary Examiner—Gus T. Hampilos
Assistant Examiner—J. Reed Batten, Jr.
Attorney, Agent, or Firm—Benasutti Associates, Ltd.

[57] ABSTRACT

Apparatus and method for injecting molten lead from a reservoir into a die mold cavity formed about an aperture in the wall of a plastic battery for casting lead-alloy battery terminal connectors. Batteries are positioned adjacent the molten lead reservoir of the apparatus and mold portions move together to hold the battery containers in a clamp-like action. Molten lead is die cast under pressure into the mold cavity in which a stainless steel threaded nut is positioned. The lead is forced through a heated chamber into a portion of the mold which may be water cooled. The mold is designed to allow venting of gases, thereby eliminating porosity; and the apparatus is designed to provide casting which is free of jagged projections in the sprue hole.

13 Claims, 12 Drawing Figures

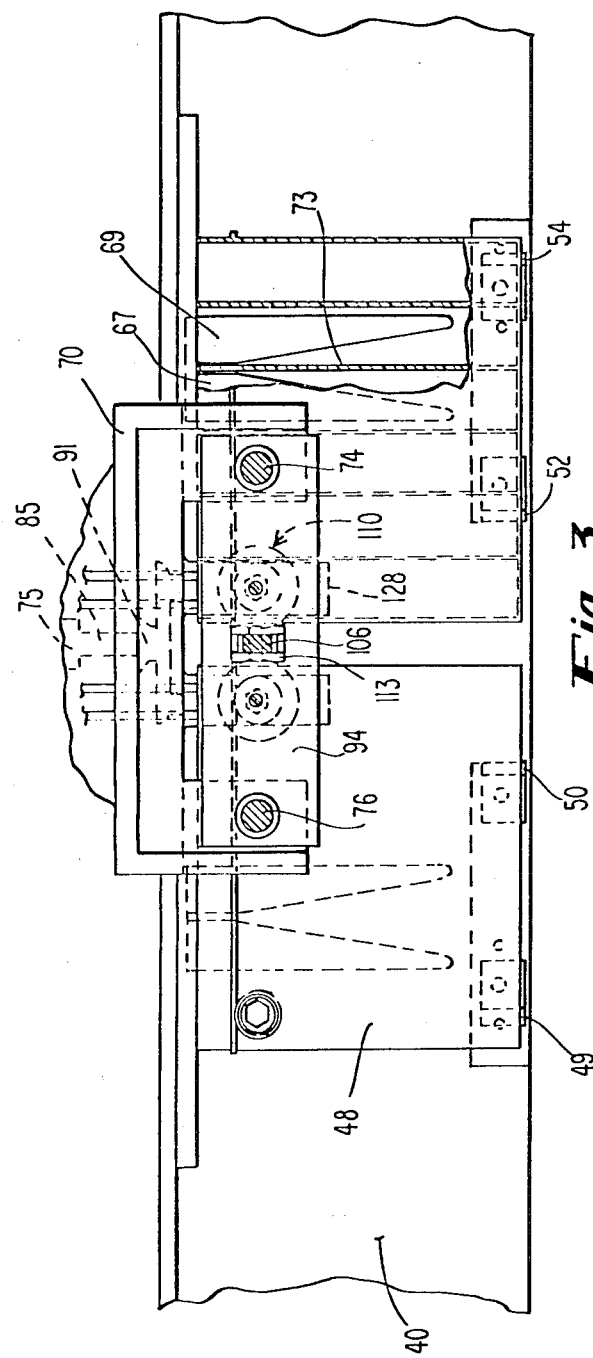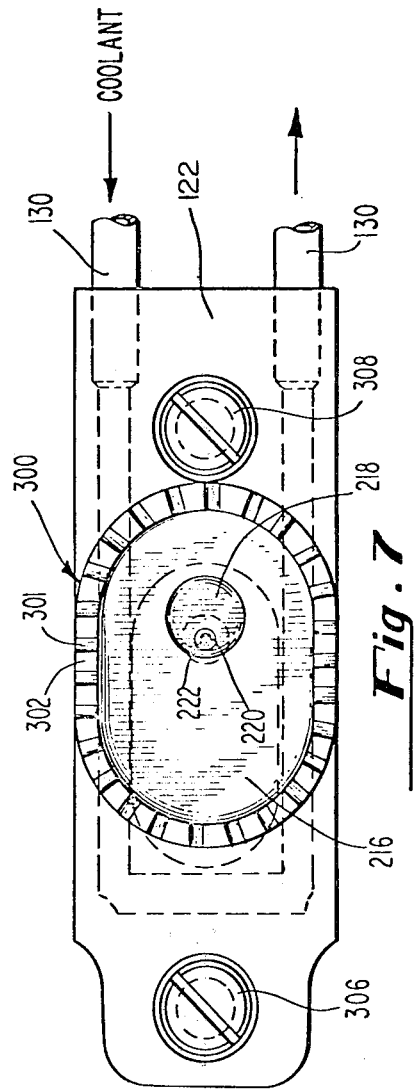

APPARATUS AND METHOD FOR CASTING LEAD INTO PLASTIC FOR SIDE TERMINAL BATTERIES

This is a division of application Ser. No. 027,656, filed Apr. 6, 1979, now U.S. Pat. No. 4,284,122, dated Aug. 18, 1981; which is in turn a division of application Ser. No. 753,835, filed Dec. 23, 1976, now U.S. Pat. No. 4,158,382, dated June 19, 1979.

BACKGROUND OF THE INVENTION

I. Field of the Invention

This invention pertains to an apparatus and method for forming battery terminal connectors through a side wall of a battery.

II. Description of the Prior Art

In U.S. Pat. No. 3,849,203 a Method For Producing Battery Terminals is disclosed. In the patent abstract, the terminal is described as including "a specially designed lead bushing adapted to be inserted through a side wall opening from the inside of the battery case. A portion of the bushing projects beyond the outside surface of the case and is surrounded by a lead locking ring. Disposed within the bushing is a hard wear-resistant, internally threaded metallic nut used in connecting the terminal to an external cable. By means of a spinning operation, the outer edge of the bushing is forced down and over the locking ring forming an integral assembly between the terminal and side wall of the battery."

Problems can occur in attaining and maintaining a good seal between a terminal connector and a battery wall when they are assembled together mechanically. The battery is full of electrolyte which will leak through small holes or openings which might be present between metal and plastic interfaces unless special adhesives are applied, or unless steps are taken to compress the parts of the terminal together against the battery wall. See U.S. Pat. Nos. 3,798,071 and 3,457,118. Connecting and re-connecting external conductors to the battery terminal can result in mechanical loosening of the pressure bond between the metal terminal and plastic or non-metal battery wall.

A different method for producing side wall battery terminals is disclosed in U.S. Pat. No. 3,874,933. As in the first method, a battery container is provided with an opening adapted for receiving the side wall terminal. The mold assembly is then formed about the opening and molten metal is then delivered under pressure through a sprue hole into the die cavity defined by the mold assembly, is circulated through the cavity and flows out of the die cavity through a second sprue. The second sprue terminates in a cavity reservoir located in a portion of the mold assembly which reservoir receives the bulk of the lead which does not remain in the die cavity. This method requires that a quantity of lead which is 3.0 to about 6.0 unit volumes of metal per unit volume of the die cavity or terminal size be used to make the terminal.

It is desirable in making batteries to minimize the amount of lead used in the battery manufacture. Hence, it would be desirable to eliminate the requirement for a reservoir or to use 3.0 to 6.0 times the amount of lead needed for the terminal, as described in U.S. Pat. No. 3,874,933.

Another problem that occurs when casting battery terminals into a mold cavity about a wall opening in the battery is that the opening into the cavity may become clogged with lead as it solidifies. When this happens, a small jagged projection is formed on the inside surface of the battery terminal where the battery terminal is to be connected to the battery straps which must be broken away from the apparatus when the part is removed. This often results in the extra step of eliminating the jagged projection on the battery terminal so that the mating and connection between the terminal and the straps can be accomplished.

SUMMARY OF THE INVENTION

The invention provides an apparatus and method for forming a battery terminal connector through a side wall of a battery. A mold cavity is formed about as aperture through the side wall of the battery case by positioning a plurality of die mold portions about the aperture. Grooves are provided on one of the mold portions such that when the mold portions are mated together the grooves connect the interior of the cavity to the atmosphere thereby allowing gases to be vented during the casting process. The opening into the mold cavity through which the molten lead is introduced into the mold cavity is heated to prevent the molten lead from solidifying in the opening during and after the molten lead is being introduced under pressure into the cavity. Means are provided for positioning an internally threaded insert in the cavity so that the resultant terminal casting will accept the connection of an external connector by screwing the connector to the terminal.

The invention also provides for injecting the molten lead from a heated reservoir through a heated portion of the apparatus into the die mold. The die mold portion adjacent the heated portion is insulated from the heated portion and may be cooled, by water cooling, for example. The reservoir of molten lead, the lead, and the mold portions are heated to certain optimum temperatures, and optimum injection pressures are used to produce extremely high quality homogeneous terminals.

In a preferred embodiment of the invention a movable mold portion is moved toward a fixed mold portion with the battery case clamped therebetween. In actuating the movable mold portion, a toggle is provided which insures a separation between the movable mold portion and the fixed mold portion of about 0.01 of an inch less than the thickness of the case wall. This insures a certain compression of the battery wall in the region of the grooves in the die mold thereby providing an additional bond and seal between the terminal and battery wall. An apparatus is also provided which will cast a plurality of terminals simultaneously.

Accordingly, it is an object of the present invention to provide for the formation of die molds about an aperture in a battery, a portion of the die mold having optimally dimensioned grooves thereon to provide for venting of the gases formed during the casting process.

Another object of the present invention is to provide an apparatus and method for injecting molten lead at preselected pressures and temperatures into the mold cavity.

Another object of the present invention is to provide an apparatus and method for heating the opening of the mold cavity whereby the opening is kept free of solidified lead.

It is another object of the present invention to provide an apparatus and method for inserting an internally threaded metal insert into the mold cavity during the casting process.

Another object of the present invention is to provide a heated chamber intermediate the die mold and the molten lead reservoir, the heated chamber being maintained at a temperature higher than the temperature of the reservoir.

Another object of the present invention is to provide for a means for positioning the die mold portions a preselected distance from one another.

Another object of the present invention is to provide simultaneous formation of a plurality of side wall battery terminals.

It is another object of the present invention to provide an apparatus and method of forming a battery terminal connector through a side wall of a battery.

This and other objects of our invention will become apparent from the following description with reference to the accompanying drawings.

BRIEF DESCRIPTION OF THE DRAWINGS

FIG. 3 is a plan view of a portion of the preferred embodiment apparatus taken as indicated by the lines and arrows 3—3 in FIG. 1.

FIG. 7 is an enlarged plan view of the preferred embodiment of the fixed die mold taken as indicated by the lines and arrows 7—7 in FIG. 5.

DESCRIPTION OF THE PREFERRED EMBODIMENTS

Figure 1:
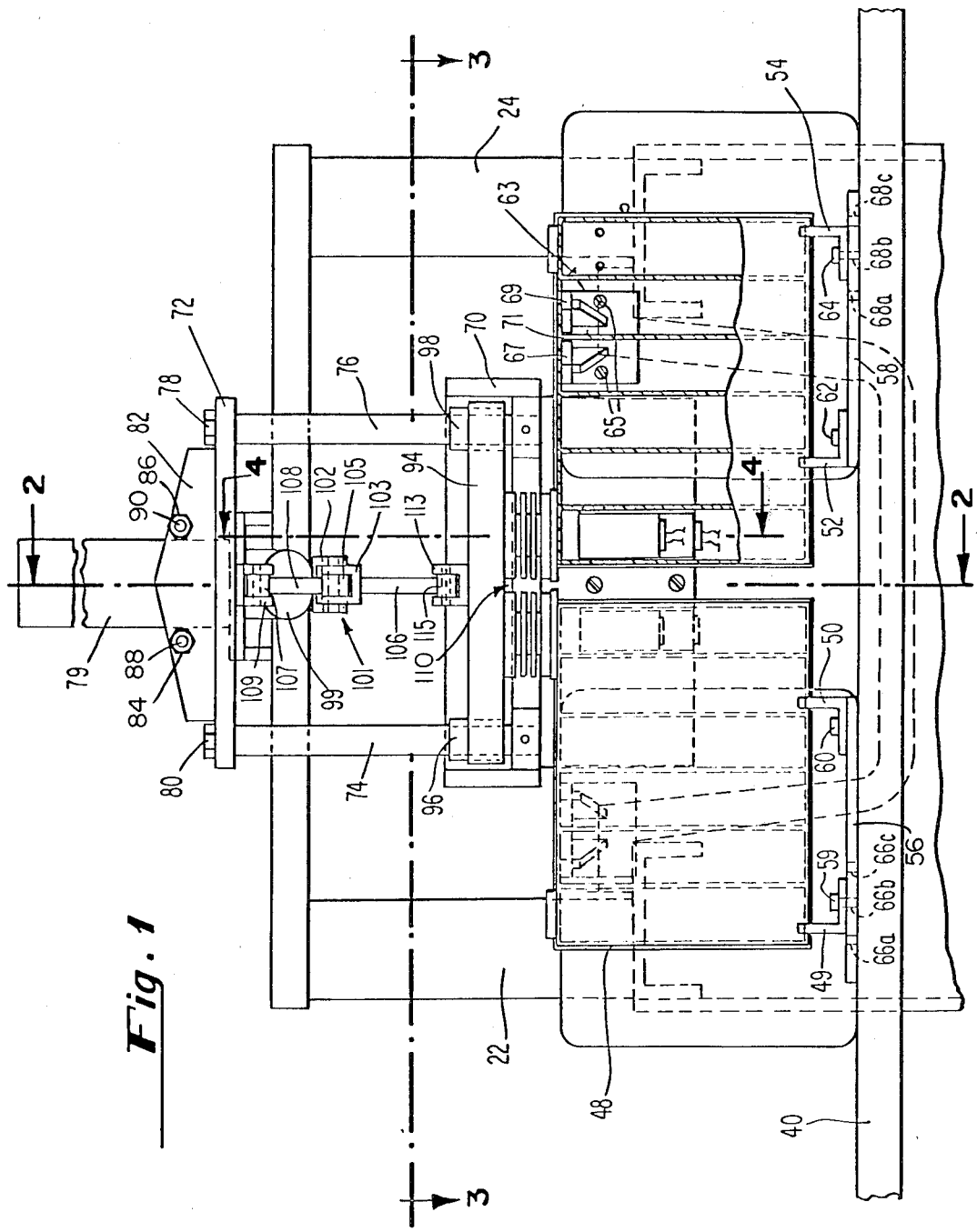
FIG. 1 is a front elevation of a preferred embodiment of the apparatus with two batteries in place; a portion of one of the batteries being shown in cross-section.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
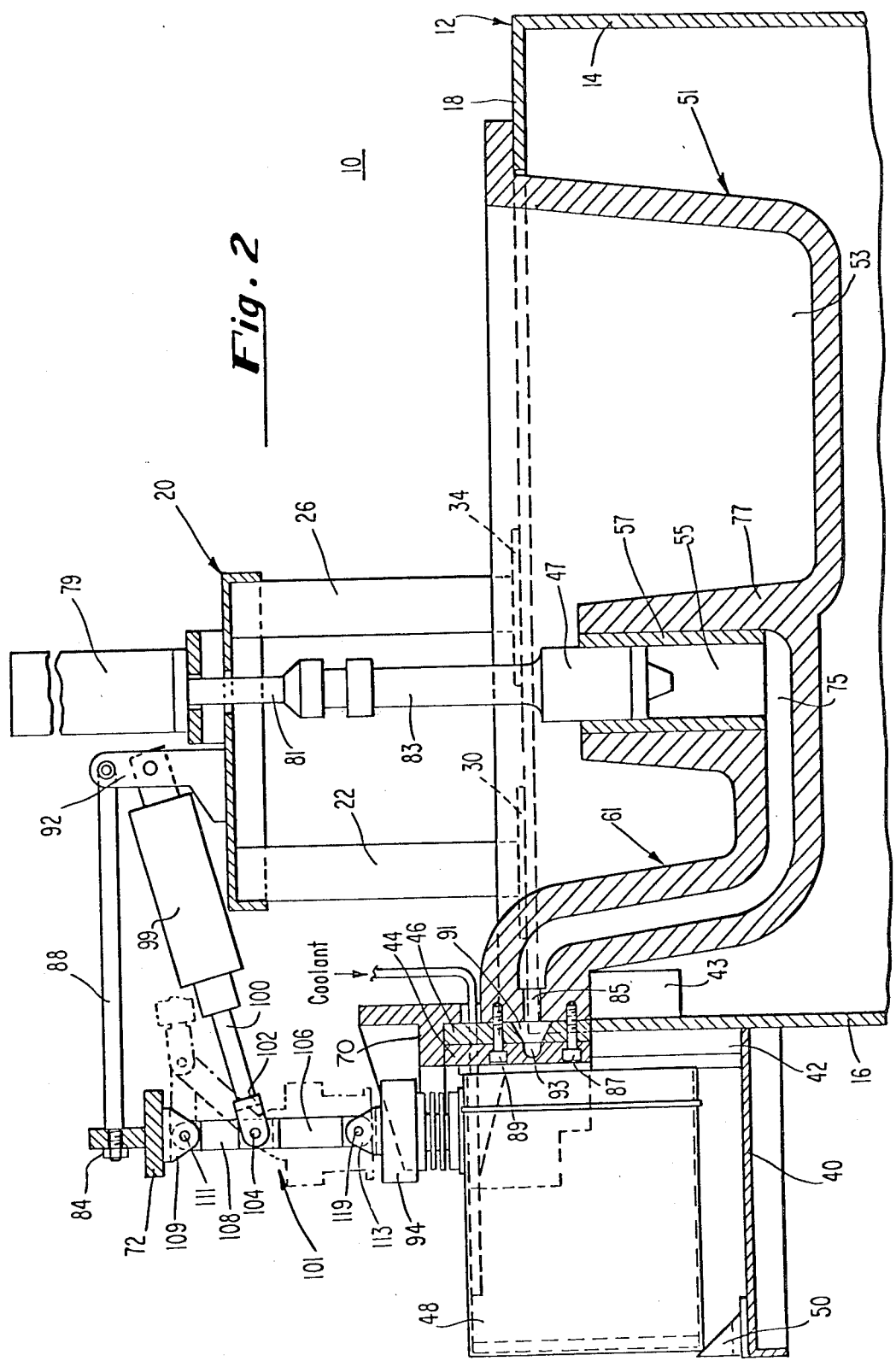
FIG. 2 is a section taken as indicated by the lines and arrows 2—2 in FIG. 1.

Referring now to the figures, FIG. 2 shows a cross-section of the apparatus 10. The main support 12 has vertical walls 14 and 16 and a top border 18. The elevated support table 20 stands on four vertical posts, including posts 22, 24, 26, which rest on post feet, including feet 30 and 34. The post feet are supported by a portion of the top border 18 and, through the vertical post, support the elevated support table 20.

The battery support table 40 extends horizontally away from the main support vertical wall 16. Block 42 engages the battery support table 40 and the vertical wall 16 and serves to support the mold interface block 44 and the pot interface block 46. In addition, the block 42 serves as a facing plate for properly positioning the battery 48 on the table 40.

Referring to FIG. 1, which is a front view of the apparatus 10, two batteries are seen to be in position under a portion of the molds of the apparatus. The batteries are supported on the battery support table 40 by battery support brackets 49, 50, 52, and 54 which are bolted to base plates 56 and 58 by bolts 59, 60, 62, and 64. In order to accommodate various size batteries, the battery support brackets 49 and 54 can be moved to alternate locations as shown by the bolt holes 66a–c and 68a–c.

To assist in positioning the battery precisely on the battery support table, a battery positioner designated generally 63 is shown in FIG. 1. It is screwed to mold interface block 44 by two screws 65. Two prongs 67 and 69 extend horizontally outward from the mold interface block and form a groove 71 therebetween. This is shown clearly in FIG. 3 where one of the the battery partitions 73 is shown positioned in the groove. Another battery positioner is shown in phantom in both FIGS. 1 and 3. Hence, a variety of different size batteries can be supported on the battery support brackets 49, 50, 52, and 54 by moving the brackets 49 and 54 to alternate positions, and the batteries can be positioned precisely with respect to the molds by inserting a battery partition within the grooves formed by the battery positioners provided. The battery positioners are also shifted horizontally to accommodate repositioning of the support brackets 49 and 54 when this occurs. Alternate screw holes are provided for screws 65.

Referring now to FIGS. 1 and 2, the upper mold assembly lower support 70 is shown in FIG. 2 engaging the mold interface block 44 and the pot interface block 46. Attached to the upper mold assembly lower support 70 and extending vertically upward are guide rods 74 and 76 which are bolted at the top by bolts 78 and 80 to the upper mold assembly upper support 72. The upper mold assembly upper support 72 has a vertical member 82 to which is attached bracing rods 88 and 90 by nuts 84 and 86. In FIG. 2, the other end of the bracing rods 88 and 90 are pinned to bracket 92 which is attached to the elevated support table 20.

In FIG. 1, mold mounting block 94 supports the movable mold assembly 110 above the batteries to be processed. The movable mold assembly 110 moves vertically up and down along the guide rods 74 and 76. The mold mounting block 94 has holes at either end through which sleeves 96 and 98 pass. The sleeves 96 and 98 surround the guide rods 74 and 76 for movement of the mold mounting block 94 and movable mold assembly 110 up and down.

The movable mold assembly 110, seen in FIG. 1, is moved up and down along the guide rods 74 and 76 by action of the cylinder 99 which is attached at one end of bracket 92. The rod 100 of the piston and cylinder arrangement 99 is attached at the other end to a toggle 101 by an outer bracket 102 and pin 104. The outer bracket 102 surrounds innerbracket 103 of toggle lower arm 106 and bracket 103 surrounds knuckle 105 of toggle upper arm 108. All are held together by pin 104. Upper arm 108 has at its other end a knuckle 107 which is attached to bracket 109 by pin 111, bracket 109 being attached to the upper mold assembly upper support 72. Bracket 113, attached to the mold mounting block 94, surrounds knuckle 115 attached to one end of lower arm 106. Pin 119 connects bracket 113 to knuckle 115.

When the rod of the piston is energized, it moves forward straightening the arms 106 and 108 of the toggle and moving the mold assembly in a vertically downward direction guided by the guide rods. When the rod 100 is retracted, it moves to the position in phantom in FIG. 2 and the arm 108 moves to a substantially horizontal position and the arm 106 moves to a diagonal position as shown. In this way, the upper movable mold assembly is spaced apart from the fixed mold assembly in the casting position at a spacing which is precisely set from each casting to the next.

FIG. 2 shows the pot 51 which contains the molten lead. The pot is divided into three portions: the reservoir, designated 53; the piston cylinder region, the piston labeled 47, the cylinder labeled 55, and the walls of the cylinder having a lining 57; and the channel region, labeled generally 61. The pot is supported in the rear by resting on the top border 18 of the main support 12, and by having the neck of the channel portion 61 resting on block 43 which is attached to wall 16.

During the casting process, molten lead pours into channel 75 through openings (not shown) in wall 77. When cylinder 79 is activated, the piston 81 extends downward along with the connecting rod 83. The connecting rod 83 is connected to the piston 47 which moves downward in the cylinder 55 thereby exerting a pressure on the molten lead in channel 75 and forcing the molten lead through the channel 75 into the narrow opening 85 at the end of the pot near the pot interface block 46 which is connected along with mold interface block 44 to the pot by bolts 87 and 89.

Figure 4:
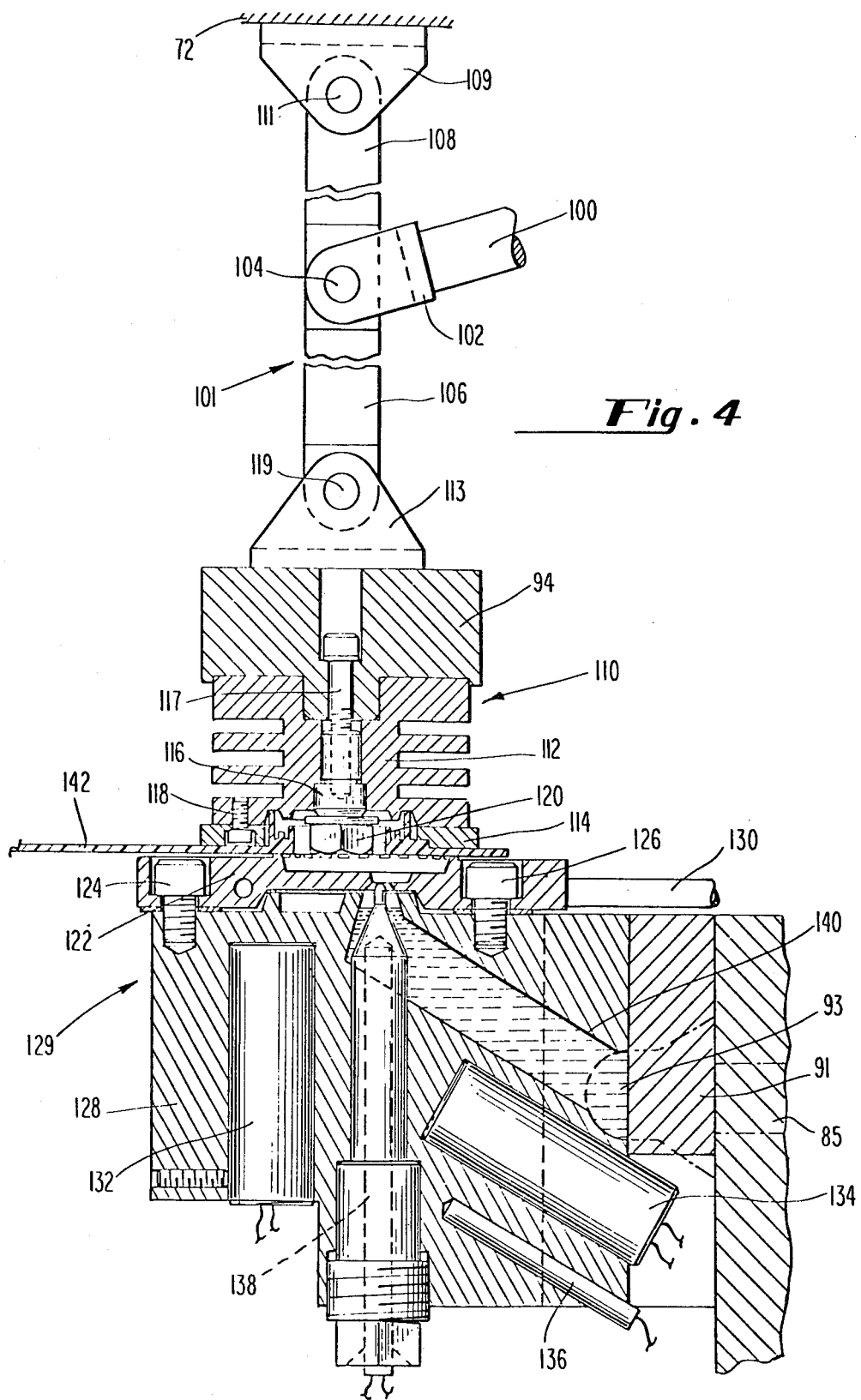
FIG. 4 is an enlarged section of the preferred embodiment apparatus taken as indicated by the lines and arrows 4—4 in FIG. 1 with the toggle linkage shown in partial breakaway.

As seen in FIGS. 2 and 3, the molten lead as it leaves opening 85 flows into an enlarged and widened opening 91 in pot interface block 46 and then into a channel 93 which runs horizontally in mold interface block 44. From there, the lead flows through separate, parallel spaced apart channels, through separate heated chambers or heads, and through sprue holes into die mold cavities. FIG. 4 shows a cross-section of one of the heated chambers or heads 128 with a channel 140. With this embodiment of dual channels 140 and heads 128, two terminal connectors can be cast simultaneously in two separate batteries, placed side by side as in FIG. 1. The spacing between the mold cavities and heads is greater than twice the distance between the aperture and the battery wall and the nearest end of the battery wall but it is less than the spacing between apertures in the same battery. Hence, various size battery cases can be handled by the apparatus without the necessity of changing or moving molds.

Referring to FIG. 4, the movable mold assembly 110 is comprised of the mold mounting block 94, the upper movable die mold portion 112, the lower movable die mold portion 114, and the insert positioner member 116. The insert positioner member 116 fits within a recess in the upper movable die mold portion 112. The insert positioner member 116 is connected to a bolt 117 which is introduced into a recess in the mold mounting block 94 and proceeds down through a narrow opening in the upper movable die mold portion until it contacts the insert positioner member 116.

The lower movable die mold portion 114 is connected to the upper movable die mold portion 112 by a bolt 118. The insert positioner member 116 acts as a means for positioning or centering an internally threaded insert 120 into the center of the mold cavity.

Fixed die mold portion, designated 122, is shown in FIG. 4 below the movable mold assembly 110. It is connected by bolts 124 and 126 to a heated head portion 128 of the fixed mold assembly 129. The fixed die mold portion 122 is equipped with cooling tube 130.

The head portion 128 is heated by heaters 132 and 134 and the temperature is monitored by thermocouple 136. A central heater for heating the opening to the mold cavity is shown in FIG. 4 labeled 138. The entire passageway of the molten lead from the pot is shown in FIG. 4 starting with the pot narrow channel 85, the enlarged channel region 91 in the interface block 46, and then to the horizontal portion 93 of the channel in the mold interface block 44 before entering the individual channel portions 140 in each heated head portion 128.

The head 128 is heated to a temperature between 750° F. and 775° F. This is done in order to control the temperature of the molten lead that passes through the head 128 through the channel 140 into the mold cavity. The temperature of the molten lead must be controlled because problems occur when injecting lead at too high a temperature. First of all, if the lead is injected at a temperature over 800° F. blowouts in the mold sometimes occur making the process commercially less desirable. Secondly, if the lead is injected at a temperature over 800° F. spaces form upon cooling which leave a gap between the lead and the plastic portion of the aperture surrounding the casting. This is believed to be due to shrinkage of the plastic when the plastic encounters too high a temperature. On the other hand, the pot or reservoir of molten lead can not be heated to 800° F. or more since this temperature can cause problems of the lining 57 in the cylinder 55 binding the piston 47. Hence, the temperature of the pot or reservoir is kept between 700° F. and 750° F. The result is that the head 128 is heated to a higher temperature than the reservoir or pot 51.

Figure 5:
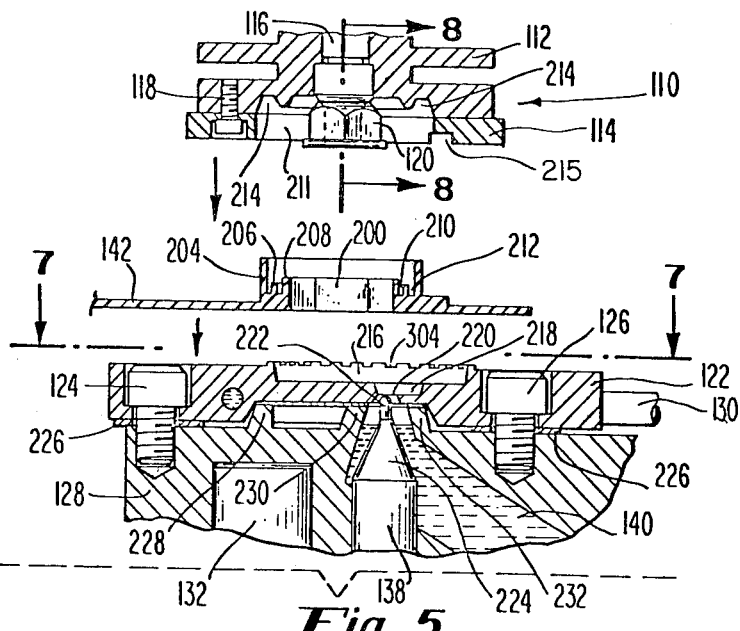
FIG. 5 is a cross-section of a preferred embodiment of the die molds shown on either side of a portion of the battery wall with the terminal opening, the molds being shown with an insert for insertion in the mold cavity and a portion of the heated chamber shown in cross-section.

Referring to FIG. 5, the plastic battery wall 142 can be seen placed between the movable mold above and the fixed mold below. Typically, the battery wall is made of a polypropylene-copolymer material. The portion of the battery wall surrounding the aperture is raised and three annular rings 204, 206, and 208 are present. Among each of the annular rings, annular depressions 210 and 212 are created. These rings and depressions serve to provide a good seal around the terminal casting in the battery aperture when the molten lead is introduced into the mold cavity which will be formed about the aperture. The polypropylene-copolymer has a melting point which is less than that of molten lead and during the period when the molten lead is solidifying in the mold cavity a softening takes place thereby creating a good seal.

Above the battery wall 142 and aperture 200, is the movable mold assembly 110. The lower movable die mold portion 114 is shown attached by bolt 118 to the upper movable die mold portion 112. Together they form the upper portion 211 of the mold cavity. Uppermost in this portion of the cavity are two notches 214 and the lower portion of the movable mold 114 has a notch 215 adjacent the mold cavity. The insert positioner 116 provides a means of positioning the insert 120 in the mold cavity and for automatically releasing the insert in the casting upon withdraw of the insert positioner from the casting when the movable assembly is retracted.

Figure 8:
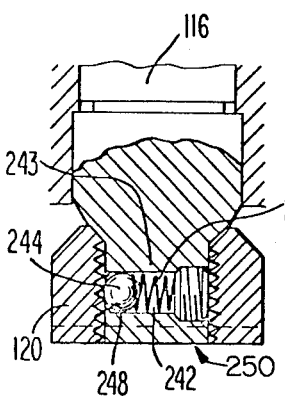
FIG. 8 is an enlarged cross-section of the preferred embodiment of the insert positioner portion of the movable die mold taken as indicated by the lines and arrows 8—8 in FIG. 5.

FIG. 8 is a cross-section of the insert positioner 116 and the insert 120 as taken along the lines and arrows 8—8 in FIG. 5. The insert 120 is typically an internally threaded insert of a non-plumbic material. For example, stainless steel could be used to provide a metal insert which is harder than the surrounding lead. This will provide a hardened threaded surface to which many connections of an external conductor can be made. The insert positioner or insert positioning means 116 comprises a cylindrical member 250 having a diameter which is selected to slide across the inside diameter of the threaded portion 248 of the insert. In the embodiment shown in FIG. 8, the cylindrical portion 250 of the insert positioning means 116 has a horizontally disposed bore 242 therein. Within a bore is a spring 246 attached at one end to a screw head inserted in the threaded portion of the bore and compressed at the other end by a sphere 244. Together the spring and sphere exert an outward force against the threaded portion of the insert 120. When the molten lead is poured into the cavity it surrounds the insert 120 and when it solidifies it secures the insert within the casting. When the movable mold assembly is withdrawn along with the insert positioner 116, the sphere 244 is free to rotate as a cylindrical portion is withdrawn from the insert. The outward force of the rotating sphere and spring 246 is small compared to the retaining force of the casting surrounding the insert 120. Hence, the embodiment shown in FIG. 8 of the insert positioning means provides a means for positioning the insert within the mold cavity and for automatically releasing the insert in the casting upon withdraw of the insert positioning means from the casting. Previously, it was thought that such an internally threaded insert could be placed in a die cavity only through the means of a threaded shaft which screws securely into the insert thereby preventing molten lead from entering. To withdraw the threaded insert after the casting was complete, it was necessary to turn or spin the shaft to de-thread the shaft from the insert. In the embodiment shown in FIG. 8, a simplified means of inserting the insert is provided while still preventing molten lead from entering the interior region of the internally threaded insert. The insert positioning means 116 is seen to form a seal along its tapered portions which mate with the tapered portions of the top surface of the metal insert.

Figure 11:
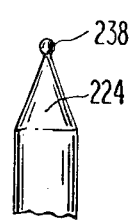
FIG. 11 is an alternate embodiment of the tip portion of the central heater shown in FIG. 5.
Figure 12:
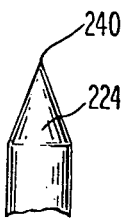
FIG. 12 is an alternate embodiment of the tip portion of the central heater shown in FIG. 5.

Referring once again to FIG. 5, below the battery wall 142 and aperture 200 is the fixed die mold portion 122 connected to the head 128 by the bolts 124 and 126. The lower portion of the mold cavity labeled 216 in FIG. 5 is formed by the die mold portion 122 and has a lowermost region labeled 218. This lowermost portion 218 will form a boss on the final casting, the boss being the point of connection between the terminal connector and the straps of the battery stacks within. Molten lead from channel 140 is introduced into the mold cavity portions 216 and 211 through an opening or sprue hole 220. This sprue hole or opening 220 opens directly into the boss region 218 of the cavity. If some means were not available to prevent molten lead for solidifying within this sprue hole or opening 220, the hole would clog or a jagged projection would develop on the boss formed by the cavity 218. These jagged projections are undesirable since they must be removed in order to ensure a firm connection and fit between the boss on the terminal connector and the straps of the battery. To ensure that molten lead does not solidify within this opening, the central heater 138 is inserted into the head 128. The central heater 138 has a tip portion 224 which is adjacent to the sprue hole and mold cavity. Engaging the tip portion of the central heater 138 and forming a part thereof is the terminus 222 of the central heater. This terminus is heated to a temperature sufficient to keep the molten lead molten during the casting process and during the withdrawal of molten lead from the channel adjacent the cavity when the casting process is complete. In the embodiment shown in FIG. 5, the terminus is a cylinder with a rounded end. FIG. 11 shows an alternate embodiment of the central heater 138 with tip portion 224 and spheroidal terminus 238. In FIG. 12, the terminus of the tip portion 224 is shown as conical. See 240 FIG. 12.

Referring back to FIG. 5, the top surface of the fixed mold portion 122 shown in cross-section is slightly raised with a series of grooves therearound. The depth of the grooves is noted at 304. The characteristics of this raised portion of the fixed die mold 122 can be seen in FIG. 7 which is a plan view of the fixed die mold portion 122 taken along the lines and arrows 7—7 in FIG. 5. The slightly raised portion of the mold is a mold sealing ring 300. It is this portion of the fixed die mold which presses against the battery wall 142. A series of grooves 301 are shown spaced around the mold cavity on the mold sealing ring 300. The grooves connect the interior region of the mold cavity to the atmosphere. This allows the venting of gases from within the cavity to the atmosphere during the casting process. In the embodiment shown in FIG. 7, the width of the grooves has been chosen to be about 0.06 inches and the depth is between 0.004 and 0.006 inches. The spacing 302 between adjacent grooves is about 0.09 inches.

Figure 6:
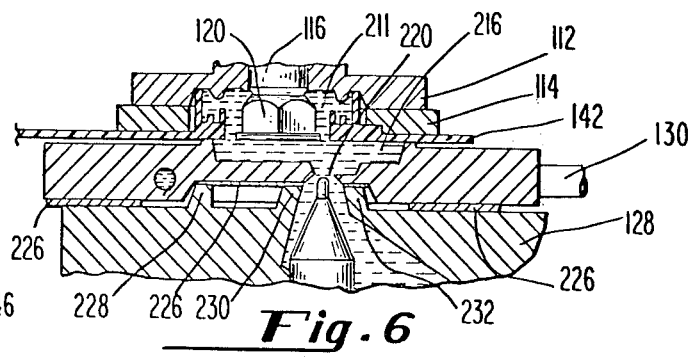
FIG. 6 is a cross-section of the preferred embodiment die molds with insert and battery wall and terminal opening of FIG. 5 shown in the casting position with molten lead filling the mold cavity.

When the cylinder 99 actuates the toggle mechanism and the toggle arms 106 and 108 straighten out, the mold mounting plate 94 along with the movable mold assembly 110 slide along the guide rods 74 and 76 to press against the battery case. Referring to FIG. 6, the lower portion 114 of the movable mold assembly 110 presses against the plastic battery mold 142 and the annular ring 204 of the battery wall aperture engages the top surface of the notches 214 in the movable mold portion 112. The fixed mold portion 122 presses against the battery wall 142 along the mold sealing ring 300 with grooves 301. The toggle mechanism 101 insures that a preselected spacing between the lowermost portion of the movable mold assembly and the fixed mold portion results. Typically, battery walls of the polypropylene-copolymer type are in the order of 0.07 inches thick and the preselected spacing between the mold portions is selected to be 0.06 inches which results in a compression of the battery wall 142 and mold sealing ring of 0.01 inches, some of which is taken up in the grooves. The grooves are in the order of 0.004 to 0.006 inches deep and can therefore take up some of this 0.01 difference in compression. This still allows an opening for the venting of gases but the opening is too small to allow molten lead to flow out of the cavity. As the case material softens, a slight imprint of the grooved mold portion is made on the case surface, suggesting that continued compress can cause partial closure of the vents during casting.

FIG. 6 shows the molten lead flowing through the channel 140 and up and around the terminus 222 of the central heater. The molten lead continues through the sprue hole or opening surrounding the terminus and into the boss region of the cavity filling the cavity around the insert 120. When the molten lead at a temperature less than 800° F. but greater than 750° F. contacts the polypropylene-copolymer wall of the battery, a softening of the battery wall takes place thereby insuring a good seal. This softening and sealing effect takes place particularly in the depressions 210 and 212 between the annular rings 204, 206, and 208.

The pressure at which the molten lead is introduced into the cavity is important. It has been found that successful castings can be made when the pressure at which the molten lead is injected into the die mold cavity is greater than 300 psi and less 650 psi. More desirably the pressure should be kept between 640 psi and 650 psi. The actual pressure delivered by the cylinder 79 in FIG. 2 is approximately 430 psi. But the cross-sectional area of the piston 47 is greater than the cross-sectional area of the cylinder 79 and this results in a mechanical advantage so that a final injection pressure of 640 psi to 650 psi is attained.

The total cycle for casting side terminals is approximately seven seconds with two and a half seconds required for the injection stroke of the piston so that between 2.5 to 5.0 seconds of cooling time occurs subsequently to the injection stroke.

The fixed mold portion 122 is water cooled by circulating water through tubes 130 which are positioned in the fixed mold portion 122. The mold must be cooled in order to prevent too high a temperature in the battery wall. Polypropylene deflects at approximately 180° F. and melts at over 300° F. This combination of the mold 122 being cooled to about 140° F. to 170° F. along with the head portion being heated to 750° F. to 775° F. with an injection pressure of 640 psi to 650 psi insures a quality casting. Since the head 128 is heated to such a high temperature and since the head is adjacent to the fixed mold portion 122 which is cooled to a relatively low temperature of 140° F. to 170° F., it is necessary to minimize the contact between the head and the fixed mold portion and to insulate the fixed mold portion from the head where that contact occurs. In FIG. 5, insulation 226 can be seen placed around the bolt 124 and the bolt 126. The head 128 supports the mold along the projections 228, 230, and 232 in FIG. 6. This support is just beneath the lower portion of the cavity in fixed mold support 122. Insulation 226 is also provided between these projections 228 through 232 and the fixed mold portion 122.

Figure 9:
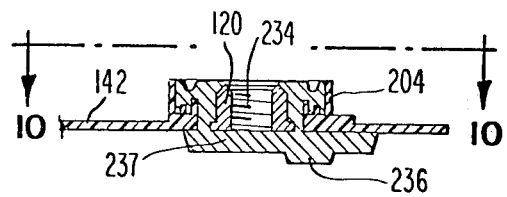
FIG. 9 is a cross-section of the terminal casting in the battery wall and terminal opening with the internally threaded insert.
Figure 10:
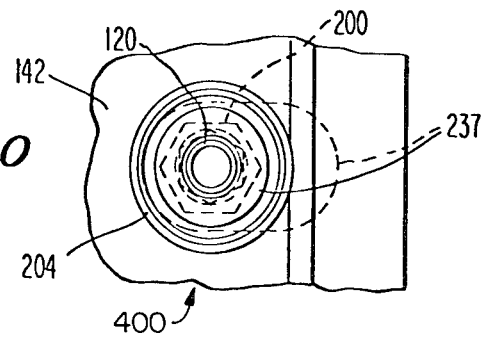
FIG. 10 is a plan view of the casted terminal connector of FIG. 9 as taken along the lines and arrows 10—10.

The end result of the injection of the molten lead into the die cavity as seen in FIG. 6 is the casting of FIG. 9 shown in cross-sectional area. The casting 237 has a lower boss region 236 and shows the distinct internally threaded insert 120 in place in the center of the casting. The threaded metal insert is shown as a tapped hole 234. The insert is shown in place in the battery wall 142 with the annular ring 204 still in tact. FIG. 10 is a top view of the casting in the battery wall as seen from the outside of the battery 400.

Battery cases with cellular partitions contained therein and apertures through one of the walls are positioned adjacent to the apparatus. The fixed mold portion and head projects outward from the apparatus and fits within one of the battery cells just below the aperture. The battery positioning means or prongs engages one of the battery partitions in the slots and the battery case is ready for processing. Cylinder 99 is actuated and the movable mold assembly moves downward along the guide rods 74 and 76 with the lower portion of the movable mold assembly pressing down on the battery wall and compressing the battery wall within the grooves on the fixed mold portion along the sealing ring. Cylinder 79 is then actuated driving the plunger or piston 47 down the cylinder 55 and forcing molten load through the channel 75 and 85 and in through the head portion along channel 140. The temperature of the molten lead in the reservoir or pot is between 700° F. and 750° F. and the molten lead passes through the head portion which is heated to a temperature between 750° F. and 775° F. The molten lead is injected through the head portion to the die cavity at a pressure of between 640 psi and 650 psi. Molten lead flows around the terminus of the central heater embedded in the head. The terminus is located in the sprue hole which is the opening allowing the molten lead to pass into the die mold cavity formed by the mold portions. This terminus keeps the molten lead molten in the sprue hole during the entire casting process and when the injection is complete the molten lead retreats back the channel 140 and is not allowed to solidify in the sprue hole thereby forming unwanted jagged projections on the boss region of the casting. Gases that are generated during the casting process are vented through holes to the outside atmosphere from the interior region of the cavity. These holes are formed by the grooves which are placed along the mold sealing lip. Even though the battery wall is somewhat compressed in the grooves, the grooves are deep enough at the initial phase of the casting to allow gases to escape but are not so large as to allow molten lead to flow out of the cavity. Constant pressure on the molds reduces the venting area as the case material softens. In the preferred embodiment these grooves have a depth of between 0.002 and 0.008 inches, the spacing between adjacent grooves being not less than 0.09 inches and the width of each groove being about 0.06 inches. Internally threaded metal insert of non-plumbic material is positioned in the mold cavity before lead is introduced into the cavity. As molten lead flows around the metal insert, it solidifies and permanently seals the insert within the casting. When the movable mold assembly is retracted from the battery, it automatically leaves behind the metal insert.

It will be understood that various changes in the details, materials and arrangement of parts which have been herein described and illustrated in order to explain the nature of this invention, may be made by those skilled in the art within the principle and scope of the invention as expressed in the following claims.

What is claimed is:

1. An apparatus for casting a lead-alloy battery terminal connector through an aperture in a wall of a plastic battery case, comprising:
   (a) a plurality of mold means positioned to surround said aperture on either side of said wall to form a die mold and to define a mold cavity;
   (b) insert positioning means operatively associated with one of said mold means and positioned for location within said mold cavity, and capable of slidingly engaging a threaded insert used in forming portions of said connector;

(c) means for injecting molten lead under pressure into said mold cavity through an opening in one of said mold means; and (d) means for venting gases from said mold cavity to the atmosphere through a plurality of openings provided in one of said mold means and disposed along the interface of said mold means with said wall.

2. The apparatus of claim 1 wherein said insert positioning means is capable of positioning said insert within said mold cavity prior to injecting said molten lead therein, and of automatically, slidingly releasing said insert in said connector after said connector has been cast.

3. The apparatus of claim 1 wherein said insert positioning means comprises a cylindrical member having a diameter selected to slide across the inside diameter of the threaded portion of said insert.

4. The apparatus of claim 3 wherein said insert positioning means further comprises biasing means for removably retaining said insert on said cylindrical member.

5. The apparatus of claim 1 wherein said insert positioning means maintains said insert in position in said mold cavity as casting material is introduced therein.

6. The apparatus of claim 1 wherein at least one of said mold means is movable with respect to the other, and wherein said insert positioning means is operatively associated with said movable mold means.

7. The apparatus of claim 1 wherein said insert is positioned within said mold cavity upon moving said movable mold means toward said other mold means.

8. The apparatus of claim 7 wherein said insert is withdrawn from said connector casting upon moving said movable mold means away from said other mold means.

9. A method for casting a lead-alloy battery terminal connector through an aperture in a plastic battery case, comprising the steps of:

(a) providing a plastic battery case having an aperture in a wall of said case;

(b) positioning a plurality of mold means to surround said aperture on either side of said wall to form a die mold and to define a mold cavity;

(c) slidingly engaging a threaded insert used in forming portions of said connector with insert positioning means operatively associated with one of said mold means and located with said mold cavity;

(d) injecting molten lead under pressure into said mold cavity through an opening in one of said mold means;

(e) venting gases from said mold cavity to the atmosphere during the injecting through a plurality of openings provided in one of said mold means and disposed along the interface of said mold means with said wall; and (f) automatically, slidingly releasing said insert from said insert positioning means, releasing said insert in said connector.

10. The method of claim 9 wherein at least one of said mold means is movable with respect to the other.

11. The method of claim 10 wherein said insert is positioned within said mold cavity when said movable mold means is moved toward said other mold means.

12. The method of claim 10 wherein said insert is released in said connector casting when said movable means is moved away from said other mold means.

13. The method of claim 10 wherein said insert positioning means is operatively associated with said movable mold means.

* * * * *